US012158717B2

(12) United States Patent
Uehara et al.

(10) Patent No.: US 12,158,717 B2
(45) Date of Patent: Dec. 3, 2024

(54) FIXING DEVICE AND IMAGE FORMING APPARATUS

(71) Applicant: KYOCERA Document Solutions Inc., Osaka (JP)

(72) Inventors: Masakazu Uehara, Osaka (JP); Tomohiro Watatani, Osaka (JP); Takuya Kawasumi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/473,651

(22) Filed: Sep. 25, 2023

(65) Prior Publication Data

US 2024/0111232 A1 Apr. 4, 2024

(30) Foreign Application Priority Data

Sep. 29, 2022 (JP) ................................ 2022-156482

(51) Int. Cl.
*G03G 15/20* (2006.01)

(52) U.S. Cl.
CPC ..... *G03G 15/2053* (2013.01); *G03G 15/2064* (2013.01); *G03G 2215/2038* (2013.01)

(58) Field of Classification Search
CPC ........... G03G 15/2053; G03G 15/2064; G03G 2215/2038; G03G 21/1619; G03G 15/2017
See application file for complete search history.

(56) References Cited

U.S. PATENT DOCUMENTS

| | | | | | |
|---|---|---|---|---|---|
| 2002/0028089 | A1 * | 3/2002 | Yoneda | G03G 15/2064 | 399/122 |
| 2009/0245865 | A1 * | 10/2009 | Shinshi | G03G 15/2064 | 399/122 |
| 2019/0265621 | A1 * | 8/2019 | Watatani | G03G 15/2053 | |
| 2020/0004183 | A1 * | 1/2020 | Yabuki | G03G 15/2053 | |

FOREIGN PATENT DOCUMENTS

| | | | |
|---|---|---|---|
| JP | 2019-138942 | A | 8/2019 |
| JP | 2019-139086 | A | 8/2019 |

* cited by examiner

*Primary Examiner* — Sandra Brase
(74) *Attorney, Agent, or Firm* — Studebaker & Brackett PC

(57) ABSTRACT

A fixing device includes a heating rotating body, a pressure rotating body, and a fixing frame. The fixing frame supports the heating rotating body and the pressure rotating body. The fixing frame includes a pair of side plates and a plurality of stays. The side plates are disposed to face each other, and supports both axial end portions of the heating rotating body and both axial end portions of the pressure rotating body. The stays are disposed between the side plates. In a XYZ coordinate in which an axis along a direction in which the side plates face each other is defined as the X-axis, and axes perpendicular to the X-axis and perpendicular to each other are defined as the Y-axis and the Z-axis, each of the stays is fastened to the side plates at least two axial directions of the three axial directions of the XYZ coordinates.

8 Claims, 8 Drawing Sheets

FIXING DEVICE AND IMAGE FORMING APPARATUS

INCORPORATION BY REFERENCE

This application is based on and claims the benefit of priority from Japanese patent application No. 2022-156482 filed on Sep. 29, 2022, which is incorporated by reference in its entirety.

BACKGROUND

The present invention relates to a fixing device which fixes a toner image on a sheet and an image forming apparatus.

A fixing device generally includes a heating rotating body and a pressurizing rotating body which come into contact with each other to form a fixing nip, and a fixing frame which supports the heating rotating body and the pressurizing rotating body. For example, the fixing frame includes left and right side plates and a stay that receive a reaction force from a pressurizing roller (corresponding to the pressurizing rotating body). Alternatively, another fixing frame includes a pair of side plates and a stay fastened to the side plates.

However, in the fixing frames described above, the stay is disposed only on the side of the pressurizing roller to provide strength against the reaction force of the pressurizing roller which is driven to be rotated. On the other hand, since the stay is not disposed on the side of the heating rotating body, the left and right side plates may be twisted. If the left and right side plates are twisted, the heating rotating body and the pressurizing rotating body may be out of position, resulting in sheet conveyance failure. In addition, in a case where the heating rotating body is a sliding belt, a problem occurs that the sliding belt meanders.

SUMMARY

A fixing device according to the present disclosure includes a heating rotating body, a pressure rotating body, and a fixing frame. The heating rotating body and a pressure rotating body come into contact with each other to form a fixing nip. The fixing frame supports the heating rotating body and the pressure rotating body. The fixing frame includes a pair of side plates and a plurality of stays. The pair of side plates are disposed to face each other, and supports both axial end portions of the heating rotating body and both axial end portions of the pressure rotating body. The plurality of stays are disposed between the side plates. In a XYZ coordinate in which an axis along a direction in which the side plates face each other is defined as the X-axis, and axes perpendicular to the X-axis and perpendicular to each other are defined as the Y-axis and the Z-axis, each of the stays is fastened to the side plates or the other stay along at least two axial directions of the three axial directions of the XYZ coordinates.

An image forming apparatus according to the present disclosure includes an image forming part which forms an image on a sheet; the fixing device which fixes the image on the sheet; and an apparatus main body by which the image forming part and the fixing device are supported. At least one of the stays of the fixing device has a positioning pin positioned to the apparatus main body.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the drawings, an image forming apparatus and a fixing device according to one embodiment of the present invention will be described.

Figure 1:
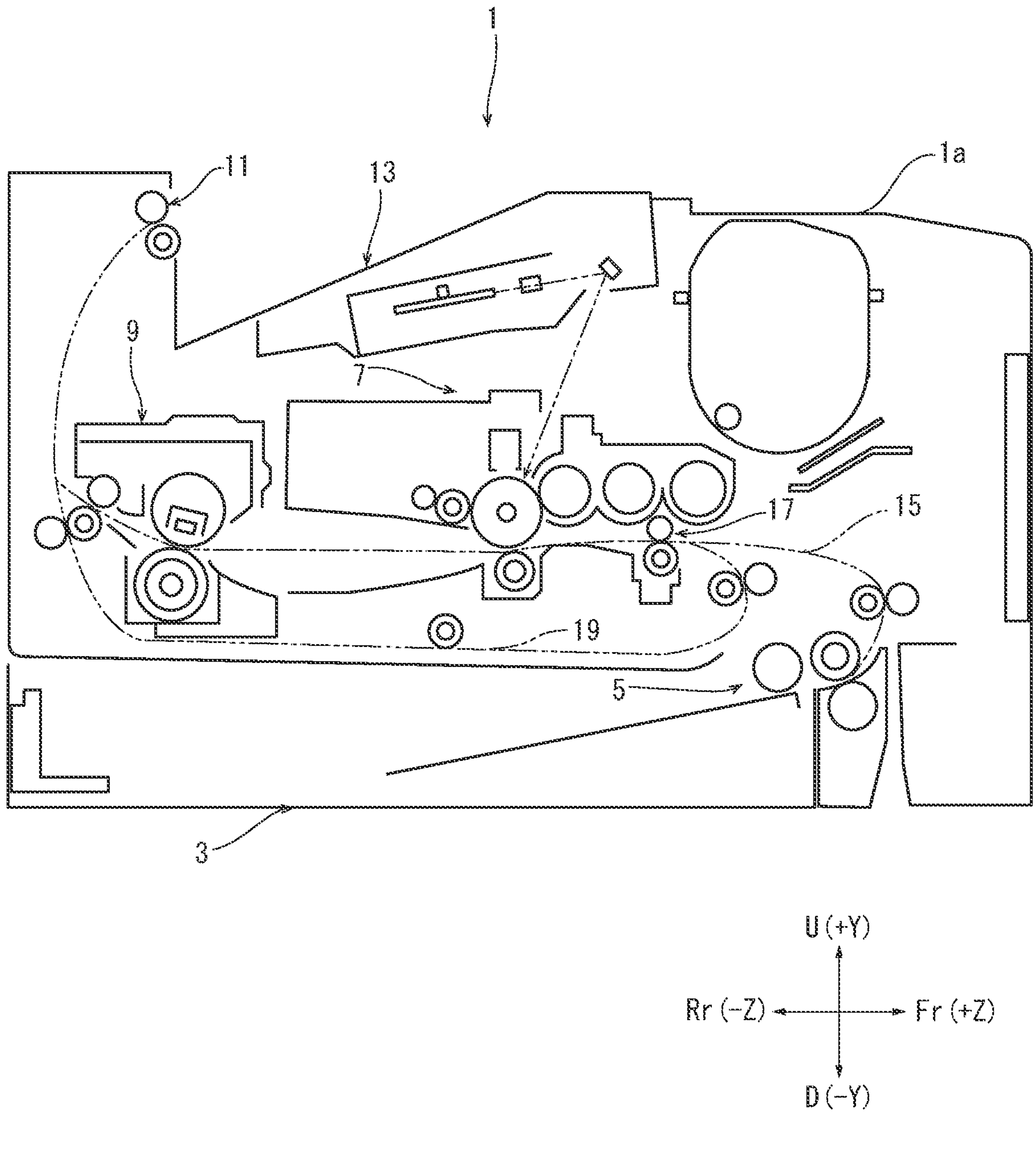
FIG. 1 is a front view schematically showing an inner structure of an image forming apparatus according to one embodiment of the present disclosure.

First, the entire structure of the image forming apparatus 1 will be described with reference to FIG. 1. FIG. 1 is a front view schematically showing the internal structure of the image forming apparatus 1. The marks U, D, Fr, Rr, L and R attached to the following drawings indicate the upper, lower, front, rear, left and right, respectively.

The apparatus main body 1*a* of the image forming apparatus 1 includes a sheet feeding cassette 3 in which a sheet is stored, a sheet feeding device which feeds the sheet from the sheet feeding cassette 3, an image forming part 7 which forms a toner image on the sheet by an electrophotographic method, a fixing device 9 which fixes the toner image on the sheet, a sheet discharge device 11 which discharges the sheet, and a sheet discharge tray 13 on which the discharged sheet is stacked. Further, a conveyance path 15 is formed in the apparatus main body 1*a*, along which the sheet is conveyed in the conveyance direction from the sheet feeding device 5 through the image forming part 7 and the fixing device 9 toward the sheet discharge device 11. On the conveyance path 15, a registration rollers pair 17 is arranged between the sheet feeding device 5 and the image forming part 7. Further, the conveyance path 15 is branched to an inversion path 19 on the downstream side of the fixing device 9 in the conveyance direction. The inversion path 19 is merged with the conveyance path 15 on the upstream side of the registration rollers pair 17 in the conveyance direction.

The sheet fed from the sheet feeding cassette 3 by the sheet feeding device 5 is conveyed along the conveyance path 15, and after the skew is adjusted by the registration rollers pair 17, the toner image is formed on the sheet in the image forming part 7. The sheet on which the toner image is formed is conveyed along the conveyance path 15 to the fixing device 9, at which the toner image is fixed on the sheet. The sheet on which the toner image is fixed is discharged to the sheet discharge tray 13 by the sheet discharge device 11. In the case of duplex printing, the sheet with the toner image fixed on one side is conveyed from the conveyance path 15 through the inversion path 19 to the conveyance path 15 again. After the sheet is conveyed along the conveyance path 15 and the skew is adjusted by the registration rollers pair 17, a toner image is formed on the other side of the sheet in the image forming part 7. The sheet on which the toner image is formed is conveyed along the conveyance path 15 to the fixing device 9, in which the toner image is fixed on the sheet. The sheet on which the toner image is fixed is discharged to the sheet discharge tray 13 by the sheet discharge device 11.

Figure 2:
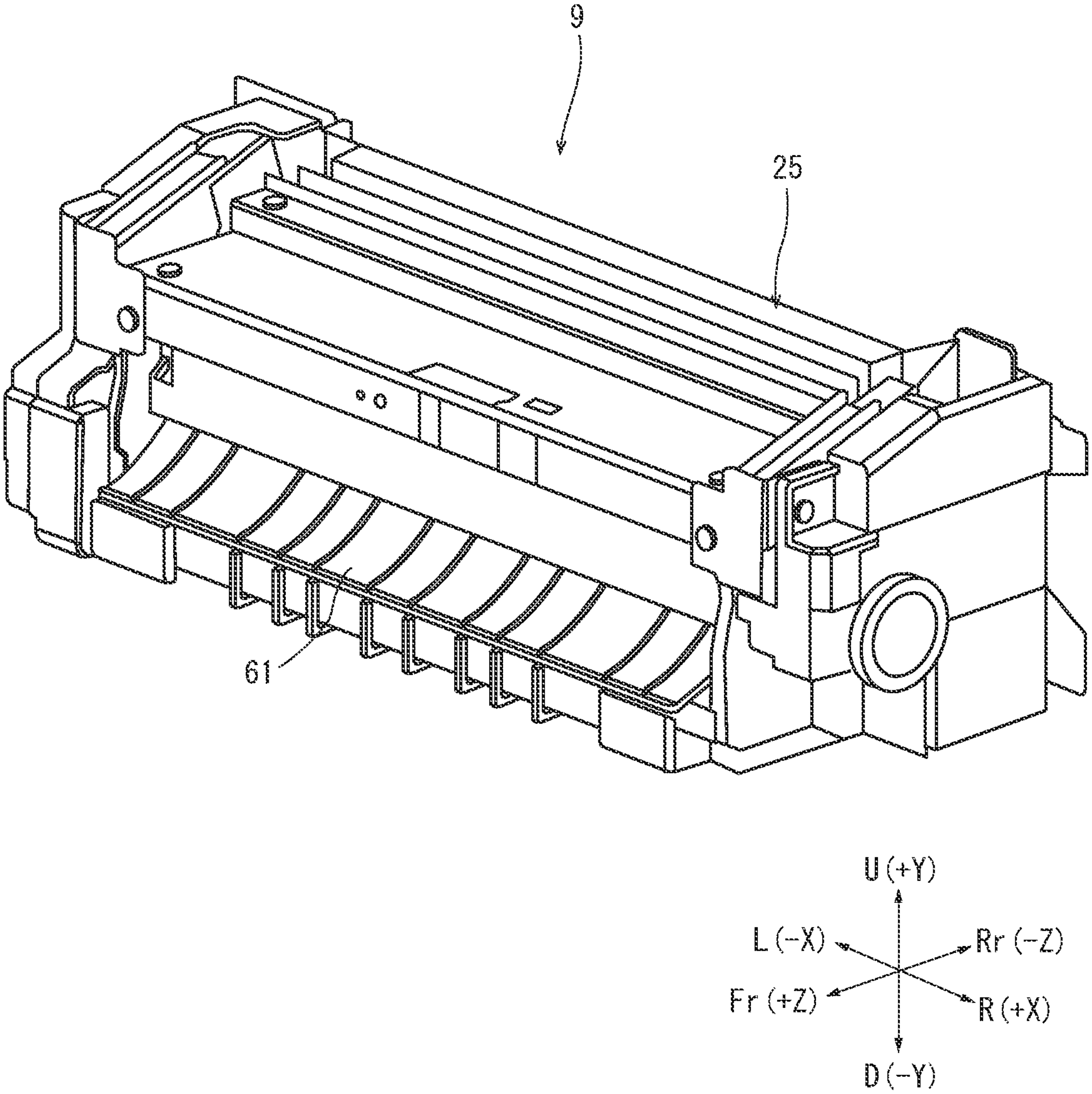
FIG. 2 is a perspective view showing a fixing device according to the embodiment of the present disclosure.

Next, the fixing device 9 will be described with reference to FIG. 2 to FIG. 4. FIG. 2 is a perspective view showing the fixing device 9, FIG. 3 is a sectional view showing the fixing device 9, and FIG. 4 is a side view showing the fixing device 9.

The fixing device 9 includes a belt assembly 21 (see FIG. 3), a pressure roller 23 (see FIG. 3), and a fixing frame 25 (see FIG. 2 and FIG. 3) which supports the belt assembly 21 and the pressure roller 23.

Figure 3:
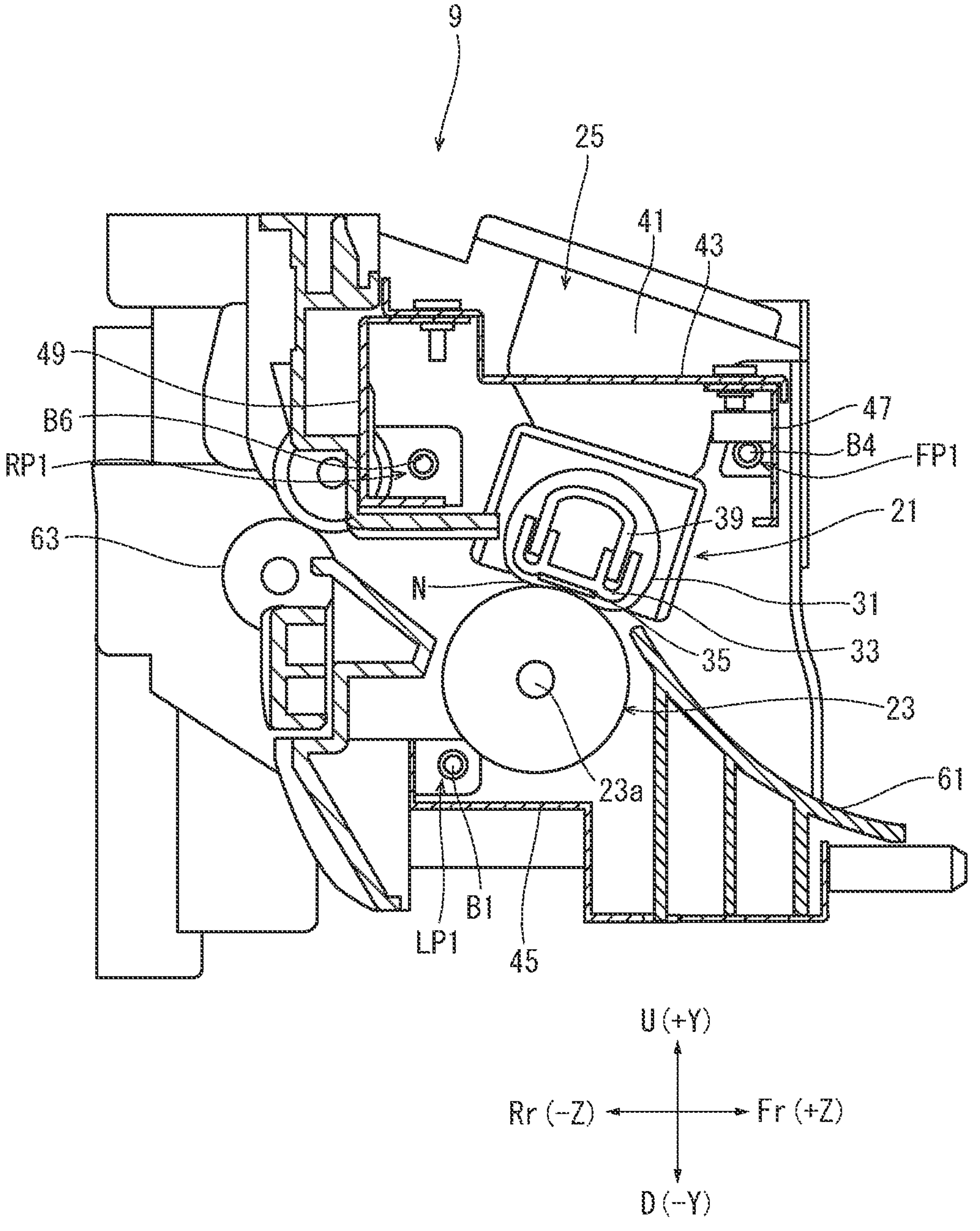
FIG. 3 is a sectional view showing the fixing device according to the embodiment of the present disclosure.
Figure 4:
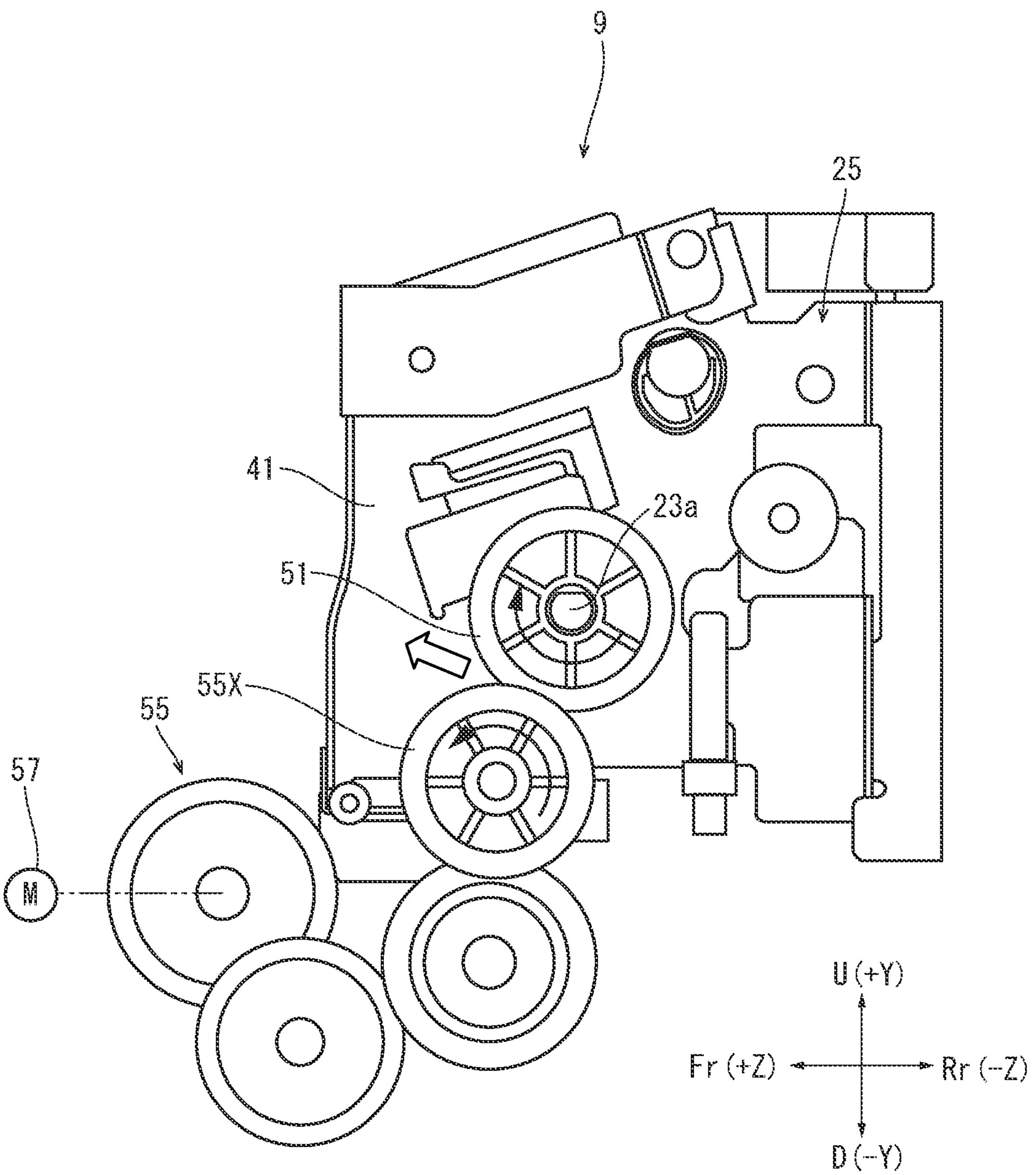
FIG. 4 is a side view showing the fixing device according to the embodiment of the present disclosure.

As shown in FIG. 3, the belt assembly 21 includes a fixing belt 31, a support member 33 supporting the fixing belt 31, a heater 35 supported by the support member 33 to heat the fixing belt 31, and a pair of end holders (not shown) which support the support member 33.

The fixing belt 31 is an endless belt having a predetermined inner diameter and a width longer than the width of the sheet. The fixing belt 31 is made of flexible material, and has a base layer, an elastic layer provided on the outer circumferential surface of the base layer, and a release layer provided on the outer circumferential surface of the elastic layer. The base layer is made of resin. The elastic layer is made of silicone rubber or the like. The release layer is made of a PFA tube or the like. The fixing belt 31 is an example of a heating rotating body of the present invention.

The support member 33 has a sliding surface facing the inner circumferential surface of the fixing belt 31. The sliding surface has a width wider than the width of the fixing belt 31, and is formed along the circumferential direction of the fixing belt 31. The support member 33 is supported by a stay 39 penetrating the hollow space of the fixing belt 31. Both ends of the stay 39 are secured to the end holders. The support member 33 is fixed on the lower surface of the stay 39, and the sliding surface faces the inner circumferential surface of the fixing belt 31. As described later, when the fixing belt 31 is traveled, the inner circumferential surface of the fixing belt 31 slides against the sliding surface of the support member 33, and the fixing belt 31 is guided along the circumferential direction. On the sliding surface, a groove is formed along the width direction.

The heater 35 is, for example, a plate-like ceramic heater that generates heat when energized. The heating area of the heater 35 is slightly wider than the width of the sheet. The heater 35 is housed in the groove formed on the sliding surface of the support member 33.

The pressure roller 23 has a rotating shaft, an elastic layer provided on the outer circumferential surface of the rotating shaft, and a release layer provided on the outer circumferential surface of the elastic layer. The pressure roller 23 is an example of a pressure rotating body of the present invention.

Figure 5:
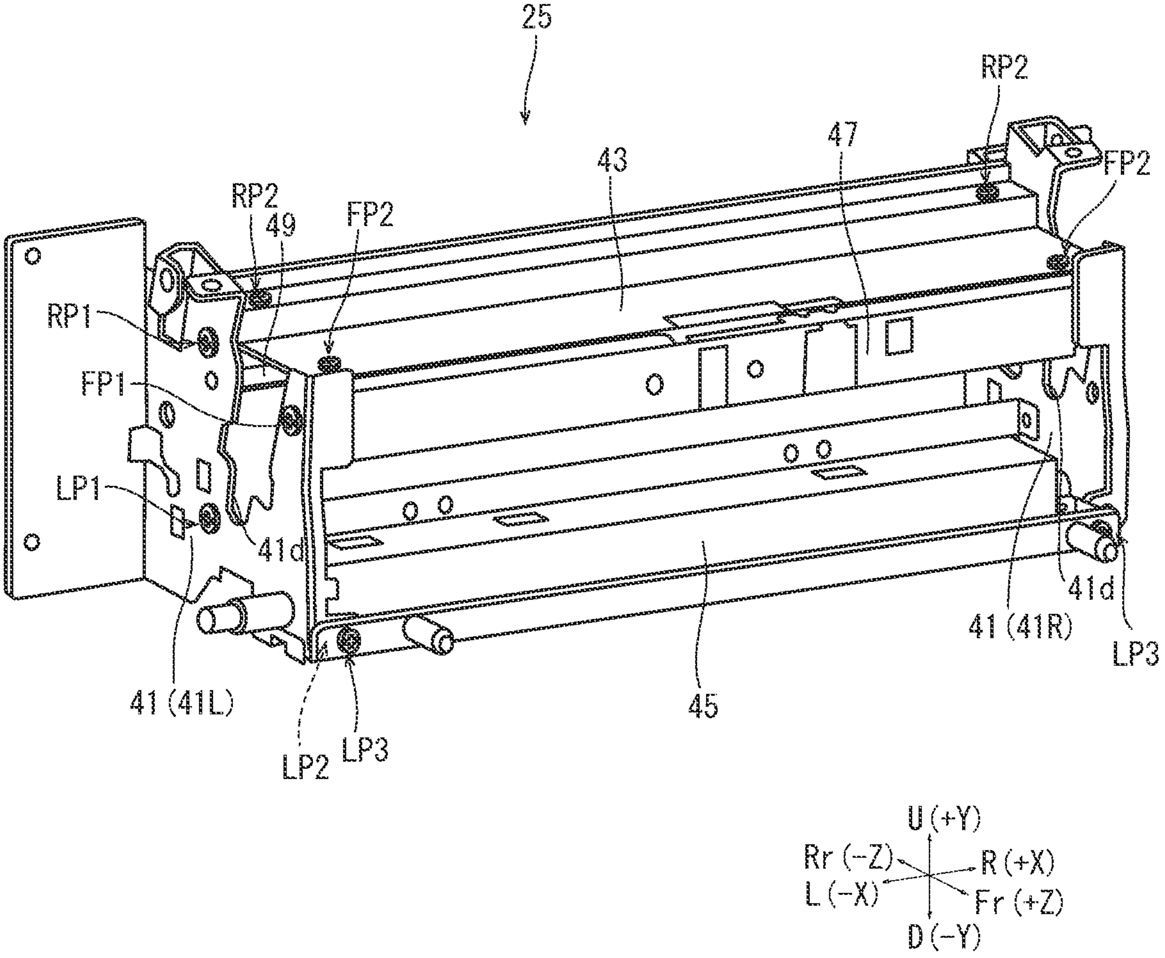
FIG. 5 is a perspective view showing a fixing frame of the fixing device according to the embodiment of the present disclosure.
Figure 6:
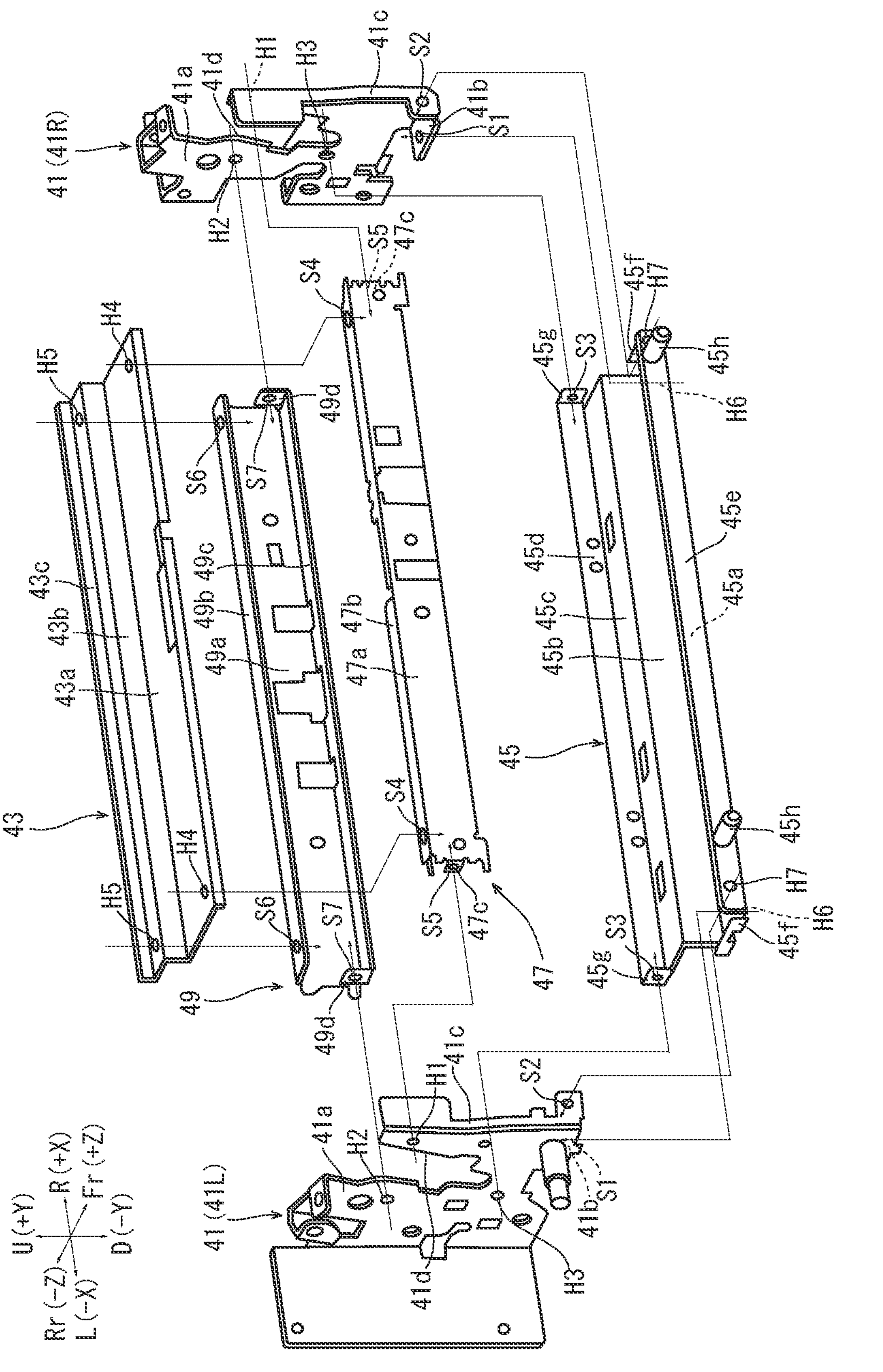
FIG. 6 is a disassembled perspective view showing the fixing frame of the fixing device according to the embodiment of the present disclosure.

Next, the fixing frame 25 will be described with reference to FIG. 5 and FIG. 6. FIG. 5 is a perspective view showing the fixing frame 25, and FIG. 6 is a disassembled perspective view showing the fixing frame 25.

As shown in FIG. 5, the fixing frame 25 is formed of a pair of left and right side plates 41L and 41R facing each other in the left-and-right direction, and four stays connecting the left and right side plates 41L and 41R. The four stays include an upper stay 43 which is disposed and fastened between the upper end portions of the left and right side plates 41L and 41R, a lower stay 45 which is disposed and fastened between the lower end portions of the left and right side plates 41L and 41R, a front stay 47 which is disposed and fastened between the front end portions of the left and right side plates 41L and 41R, and a rear stay 49 which is disposed and fastened between the rear end portions of the left and right side plates 41L and 41R. The fixing frame 25 is made of, for example, stainless steel.

First, the left and right side plates 41L and 41R will be described with reference to FIG. 6. The left side plate 41L has a main body piece 41*a*, a lower connection piece 41*b* bent rightward from the lower end of the main body piece 41*a*, and a front connection piece 41*c* bent rightward from the front edge of the main body piece 41*a*. The main body piece 41*a* has a notch 41*d* extending downward from the upper edge. The main body piece 41*a* has a front through-hole H1 on front of the notch 41*d*. In addition, the main body piece 41*a* has upper and lower rear through-holes H2 and H3 on the rear side of the notch 41*d*. The lower connection piece 41*b* has a lower screw hole S1. The front connection piece 41*c* has a front screw hole S2 at the lower portion.

The right side plate 41R has a main body piece 41*a*, a lower connection piece 41*b* bent leftward from the lower end of the main body piece 41*a*, and a front connection piece 41*c* bent leftward from the front edge of the main body piece 41*a*. The main body piece 41*a* has a notch 41*d* extending downward from the upper edge. The main body piece 41*a* has a front through-hole H1 on front of the notch 41*d*. In addition, the main body piece 41*a* has upper and lower rear through-holes H2 and H3 on the rear side of the notch 41*d*. The lower connection piece 41*b* has a lower screw hole S1. The front connection piece 41*c* has a front screw hole S2 at the lower portion.

Next, the upper stay 43 will be described with reference to FIG. 6. The upper stay 43 has a stepped cross-sectional shape, and includes a lower horizontal piece 43*a*, a vertical piece 43*b* bent upward from the rear edge of the lower horizontal piece 43*a*, and an upper horizontal piece 43*c* bent rearward from the upper edge of the vertical piece 43*b*. The lower horizontal piece 43*a* has left and right lower through-holes H4 at the left and right front corners. The upper horizontal piece 43*c* has left and right upper through-holes H5 at the left and right end portion.

Next, the lower stay 45 will be described with reference to FIG. 6. The lower stay 45 has a stepped cross-sectional shape, and includes a lower horizontal piece 45*a*, a lower vertical piece 45*b* bent upward from the rear edge of the lower horizontal piece 45*a*, an upper horizontal piece 45*c* bent rearward from the upper edge of the lower vertical piece 45*b*, and an upper vertical piece 45*d* bent upward from the front edge of the upper horizontal piece 45*c*. The lower horizontal piece 45*a* has a front connection piece 45*e* bent upward from the front edge. In addition, the lower horizontal piece 45*a* has left and right support pieces 45*f* bent upward from the left and right edges. The upper vertical piece 45*d* has left and right upper connection pieces 45*g* bent forward from the left and right edges.

The lower horizontal piece 45*a* has left and right lower through-holes H6 at the left and right end portions. The front connection piece 45*e* has left and right front through-holes H7 at the left and right end portions. In addition, the front connection piece 45*e* has left and right positioning pins 45*h* extending forward inside the left and right front through-holes H7. The left and right upper connection pieces 45*g* have left and right screw holes S3.

Next, the front stay 47 will be described with reference to FIG. 6. The front stay 47 has a vertical main body piece 47*a*, an upper connection piece 47*b* bent rearward from the upper edge of the main body piece 47*a*, and left and right connection pieces 47*c* bent rearward from the left and right edges of the main body piece 47*a*. The upper connection piece 47*b* has left and right upper screw holes S4 at the left and right end portions. The left and right connection pieces 47*c* have left and right lower screw holes S5.

Next, the rear stay 49 will be described with reference to FIG. 6. The rear stay 49 has a vertical main body piece 49*a*, an upper connection piece 49*b* bent forward from the upper edge of the main body piece 49*a*, a lower connection piece 49*c* bent forward from the lower edge of the main body piece 49*a*, and left and right connection pieces 49*d* bent upward from the left and right edges of the lower connection piece 49*c*. The upper connection piece 49*b* has left and right upper screw holes S6 at the left and right end portions. The left and right connection pieces 49*d* have left and right lower screw holes S7.

Figure 7A:
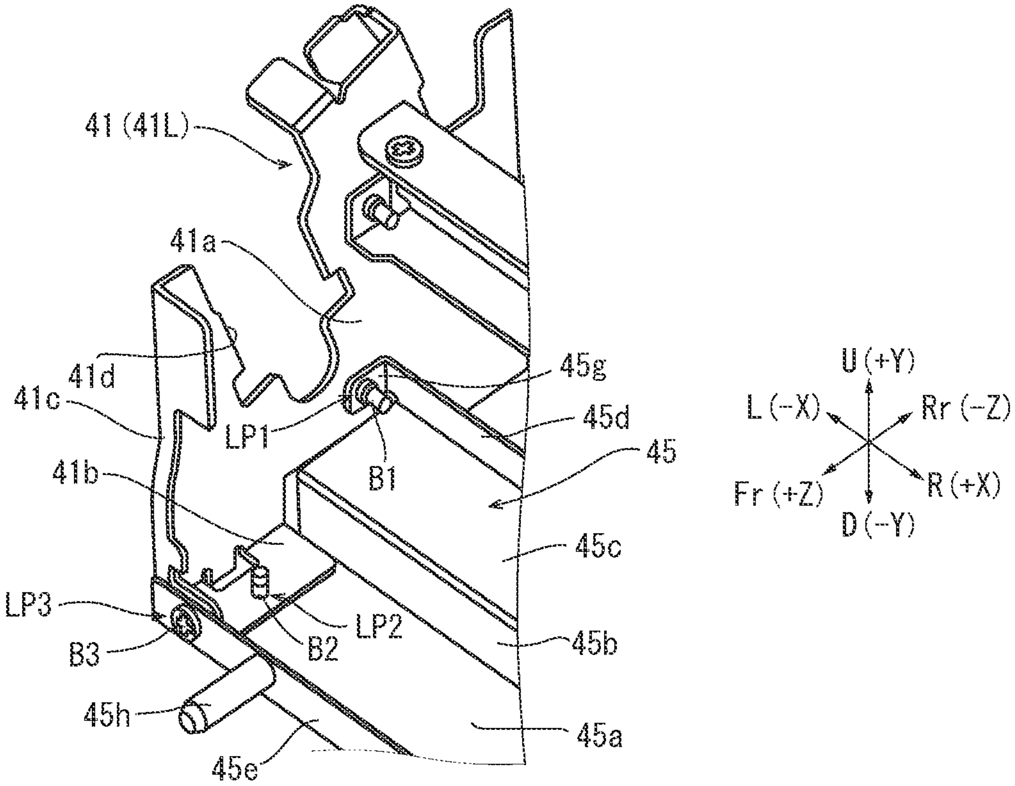
FIG. 7A is a perspective view showing fastening positions between a left side plate and a lower stay of the fixing frame in the fixing device according to the embodiment of the present disclosure.
Figure 7B:
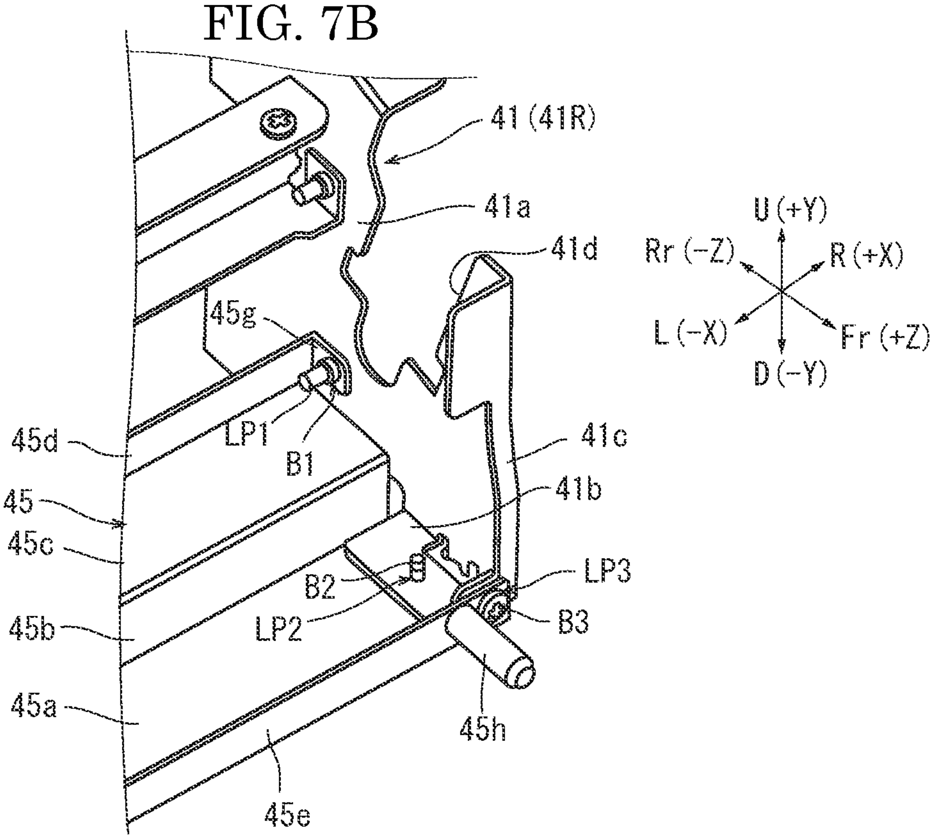
FIG. 7B is a perspective view showing fastening positions between a right side plate and the lower stay of the fixing frame, in the fixing device according to the embodiment of the present disclosure.
Figure 8A:
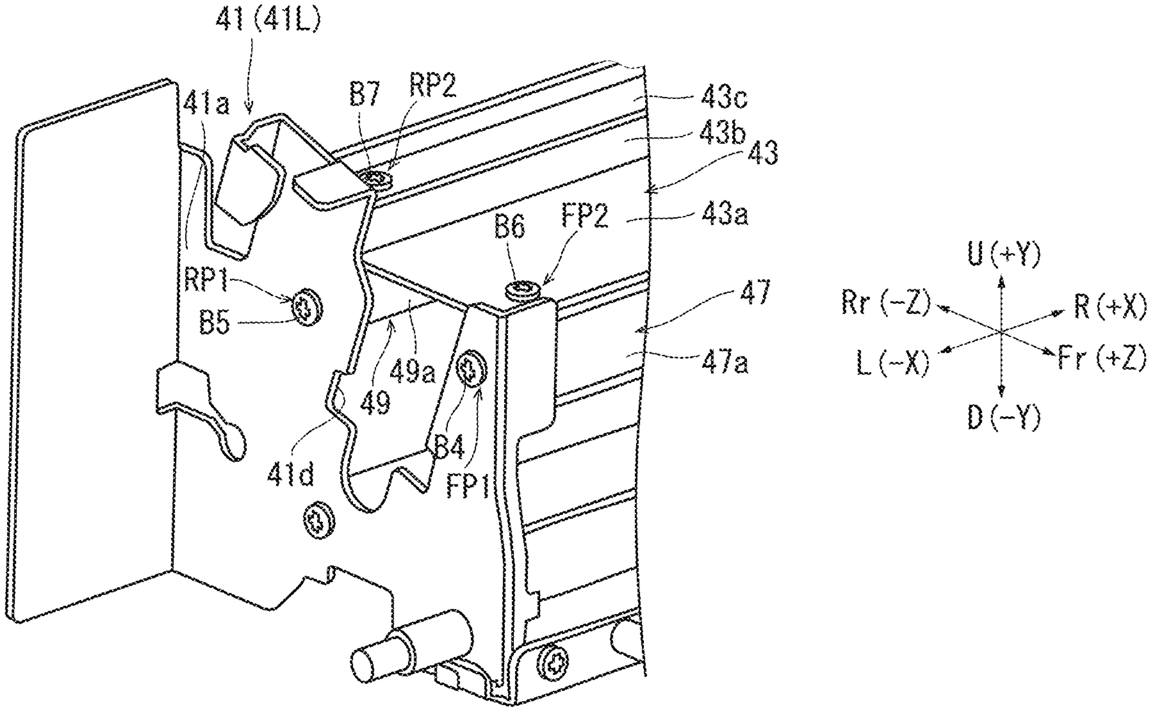
FIG. 8A is a perspective view showing fastening positions between the left side plat, and an upper stay, a front stay and a rear stay of the fixing frame, in the fixing device according to the embodiment of the present disclosure.
Figure 8B:
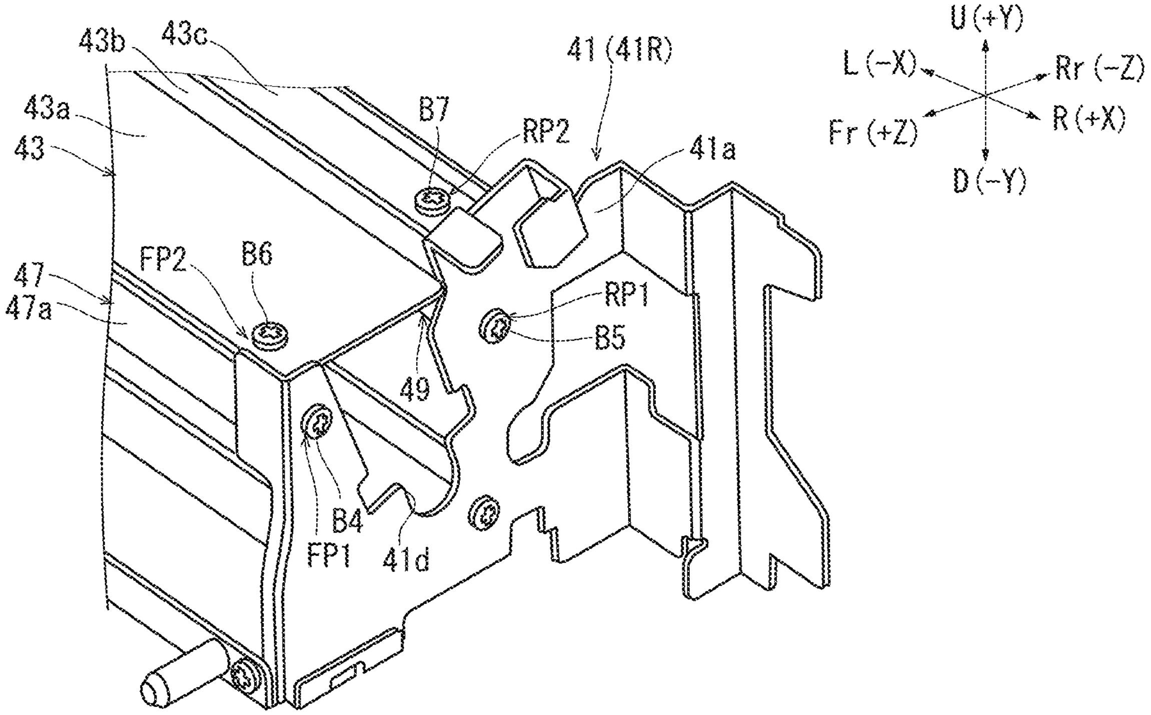
FIG. 8B is a perspective view showing fastening positions between the right side plate, and the upper stay, the front stay and the rear stay of the fixing frame, in the fixing device according to the embodiment of the present disclosure.

Next, the overall structure of the fixing frame 25 will be described with reference to FIG. 7A and FIG. 7B, FIG. 8A and FIG. 8B. FIG. 7A is a perspective view showing fastening positions of the left side plate 41L and the lower stay 45 of the fixing frame 25, and FIG. 7B is a perspective view showing fastening positions of the right side plate 41R and the lower stay 45 of the fixing frame 25. FIG. 8A is a perspective view showing fastening positions of the left side plate 41L, and the upper stay 43, the front stay 47 and the rear stay 49 of the fixing frame 25, and FIG. 8B is a perspective view showing fastening positions of the right side plate 41R, and the upper stay 43, the front stay 47 and the rear stay 49 of the fixing frame 25.

In the following descriptions, the axis along the left-and-right direction, that is, the direction in which the side plates 41L and 41R face each other is called the X-axis, the axis perpendicular to the X-axis and along the upper-and-lower direction is called the Y-axis, and the axis perpendicular to the X-axis and the Y-axis and along the front-and-rear direction is called the Z-axis. In the X-axis, the direction from the left to the right is defined as the +X direction and the direction from the right to the left is defined as the −X direction. In the Y-axis, the direction from the lower to the upper is defined as the +Y direction and the direction from the upper to the lower is defined as the −Y direction. In the Z-axis, the direction from the rear to the front is defined as the +Z direction and the direction from the rear to the front is defined as the −Z direction.

First, with reference to FIG. 6, FIG. 7A and FIG. 7B, the fastening positions between the left and right side plates 41L and 41R and the lower stay 45 will be described. The lower stay 45 is disposed between the lower end portions of the left and right side plates 41L and 41R as described above.

As shown in FIG. 7A, the left upper connection piece 45*g* of the lower stay 45 comes into contact with the right (inner) surface of the main body piece 41*a* of the left side plate 41L, and the lower rear through-hole H3 (see FIG. 6) of the main body piece 41*a* and the screw hole S3 (see FIG. 6) of the upper connection piece 45*g* are aligned in the left-and-right direction (the X-axis direction). A screw B1 is passed through the lower rear through-hole H3 from the left side (in the +X direction) and screwed into the screw hole S3 to fasten the main body piece 41*a* and the upper connection piece 45*g*.

As shown in FIG. 7B, the right upper connection piece 45*g* of the lower stay 45 comes into contact with the left (inner) surface of the main body piece 41*a* of the right side plate 41R, and the lower rear through-hole H3 (see FIG. 6) of the main body piece 41*a* and the screw hole S3 (see FIG. 6) of the upper connection piece 45*g* are aligned in the left-and-right direction (the X-axis direction). A screw B1 is passed through the lower rear through-hole H3 from the right side (in the −X direction) and screwed into the screw hole S3 to fasten the main body piece 41*a* and the upper connection piece 45*g*. Thus, the lower stay 45 is fastened to the left and right side plates 41L and 41R at the first fastening positions LP1.

Also, as shown in FIG. 7A and FIG. 7B, the lower horizontal piece 45*a* of the lower stay 45 comes into contact with the lower surface of the lower connection pieces 41*b* of the left and right side plates 41L and 41R, and the left and right lower through-holes H6 (see FIG. 6) and the left and right lower screw-holes S1 (see FIG. 6) are aligned in the upper-and-lower direction (the Y-axis direction). Screws B2 are passed through the left and right lower through-holes H6 from the lower side (in the +Y direction) and screwed into the left and right lower screw-holes S1 to fasten the lower horizontal piece 45*a* and the left and right lower connection pieces 41*b*. Thus, the lower stay 45 is fastened to the left and right side plates 41L and 41R at the second fastening positions LP2.

Also, as shown in FIG. 7A and FIG. 7B, the front connection piece 45*e* of the lower stay 45 comes into contact with the front surface of the front connection pieces 41*c* of the left and right side plates 41L and 41R, and the left and right front through-holes H7 (see FIG. 6) and the left and right front screw-holes S2 (see FIG. 6) are aligned in the front-and-rear direction (the Z-axis direction). Screws B3 are passed through the left and right front through-holes H7 from the front side (in the −Z direction) and screwed into the left and right front screw-holes S2 to fasten the front connection piece 45*e* and the left and right front connection pieces 41*c*. Thus, the lower stay 45 is fastened to the left and right side plates 41L and 41R at the third fastening positions LP3.

Furthermore, the left support piece 45*f* comes into contact with the left (outer) surface of the main body piece 41*a* of the left side plate 41L, and the right support piece 45*f* comes into contact with right (outer) surface of the main body piece 41*a* of the right side plate 41R.

Next, with reference to FIG. 6, FIG. 8A and FIG. 8B, the fastening positions between the left and right side plates 41L and 41R, and the front stay 47 will be described. The front stay 47 is disposed between the front end portions of the left and right side plates 41L and 41R.

The left connection piece 47*c* of the front stay 47 (see FIG. 6) comes into contact with the right surface (inner surface) of the main body piece 41*a* of the left side plate 41L in front of the notch 41*d*, and the front through-hole H1 of the main body piece 41*a* (see FIG. 6) and the lower screw-hole S5 of the connection piece 47*c* (see FIG. 6) are aligned in the left-and-right direction (the X-axis direction). As shown in FIG. 8A, a screw B4 is passed through the front through-hole H1 from the left side (in the +X direction) and screwed into the left lower screw-hole S5 to fasten the left connection piece 47*c* and the main body piece 41*a*.

The right connection piece 47*c* of the front stay 47 (see FIG. 6) comes into contact with the left surface (inner surface) of the main body piece 41*a* of the right side plate 41R in front of the notch 41, and the front through-hole H1 of the main body piece 41*a* (see FIG. 6) and the lower screw-hole S5 of the connection piece 47*c* (see FIG. 6) are aligned in the left- and right-direction (the X-axis direction). As shown in FIG. 8B, a screw B4 is passed through the front through-hole H1 from the right side (in the −X direction) and screwed into the right lower screw-hole S5 to fasten the right connection piece 47*c* and the main body piece 41*a*. Thus, the front stay 47 is fastened to the left and right side plates 41L and 41R at the first fastening positions FP1.

Next, with reference to FIG. 6, FIG. 8A and FIG. 8B, the fastening positions between the left and right side plates 41L and 41R, and the rear stay 49 will be described. The rear stay 49 is disposed between the rear end portions of the left and right side plates 41L and 41R.

The left connection piece 49*d* of the rear stay 49 (see FIG. 6) comes into contact with the right surface (inner surface) of the main body piece 41*a* of the left side plate 41L on the rear side of the notch 41*d*, and the upper rear through-hole H2 of the main body piece 41*a* (see FIG. 6) and the lower screw-hole S7 of the connection piece 49 (see FIG. 6) are aligned in the left-and-right direction (the X-axis direction). As shown in FIG. 8A, a screw B5 is passed through the upper rear through-hole H2 from the left side (in the +X direction) and screwed into the left lower screw-hole S7 to fasten the left connection piece 49*d* and the main body piece 41*a*.

The right connection piece 49*d* of the rear stay 49 (see FIG. 6) comes into contact with the left surface (inner surface) of the main body piece 41*a* of the right side plate 41R on the rear side of the notch 41*d*, and the upper rear through-hole H2 of the main body piece 41*a* (see FIG. 6) and the lower screw-hole S7 of the connection piece 49*d* (see FIG. 6) are aligned in the left-and-right direction (the X-axis direction). As shown in FIG. 8B, a screw B5 is passed through the upper rear through-hole H2 from the right side (in the −X direction) and screwed into the right lower screw-hole S7 to fasten the right connection piece 49*d* and the main body piece 41*a*. Thus, the rear stay 49 is fastened to the left and right side plates 41L and 41R at the first fastening positions RP1.

Next, the fastening positions between the front and rear stays 47 and 49, and the upper stay 43 will be described with reference to FIG. 6, FIG. 8A and FIG. 8B. The upper stay 43 is arranged between the upper end portions of the left and right side plates 41L and 41R. The lower horizontal piece 43*a* of the upper stay 43 comes into contact with the upper surface of the upper connection piece 47*b* of the front stay 47, and the left and right lower through-holes H4 and the left and right upper screw-holes S4 are aligned in the upper-and-lower direction (the Y-axis direction). Screws B6 are passed through the left and right lower through-holes H4 from the upper side (in the −Y direction) and screwed into the left and right upper screw-holes S4 to fasten the lower horizontal piece 43*a* and the upper connection piece 47*b*. Thus, the front stay 47 is fastened to the upper stay 43 at the second fastening positions FP2. The upper horizontal piece 43*c* of the upper stay 43 comes into contact with the upper surface of the upper connection piece 49*b* of the rear stay 49, and the left and right upper through-holes H5 and the left and right upper screw-holes S6 are aligned in the upper-and-lower direction (the Y-axis direction). Screws B7 are passed through the left and right upper through-holes H5 from the upper side (in the −Y direction) and screwed into the left and right upper screw-holes S6 to fasten the upper horizontal piece 43*c* and the upper connection piece 49*b*. Thus, the rear stay 49 is fastened to the upper stay 43 at the second fastening positions RP2.

As a result, as shown in FIG. 7A and FIG. 7B, the lower stay 45 is fastened to the left and right side plates 41L and 41R at the first to third fastening positions LP1, LP2 and LP3. In the first fastening position LP1, the lower stay 45 is fastened to the left and right side plates 41L and 41R along the X-axis direction. More specifically, the lower stay 45 is fastened to the left side plate 41L along the +X direction and to the right side plate 41R along the −X direction. In the second fastening position LP2, the lower stay 45 is fastened to the left and right side plates 41L and 41R along the +Y direction. In the third fastening position LP3, the lower stay 45 is fastened to the left and right side plates 41L and 41R along the −Z direction.

The first to third fastening positions LP1, LP2 and LP3 are aligned on the same axis in the X-axis direction.

The front stay 47 is fastened to the left and right side plates 41L, 41R and the upper stay 43 at the first and second fastening positions FP1, FP2. In the first fastening position FP1, the front stay 47 is fastened to the left and right side plates 41L and 41R along the X-axis direction. More specifically, the front stay 47 is fastened to the left side plate 41L along the +X direction and to the right side plate 41R along the −X direction. In the second fastening position FP2, the front stay 47 is fastened to the upper stay 43 along the −Y direction. The first and second fastening positions FP1 and FP2 are aligned on the same axis in the X-axis direction.

The rear stay 49 is fastened to the left and right side plates 41L, 41R and the upper stay 43 at the first and second fastening positions RP1, RP2. In the first fastening position RP1, the rear stay 49 is fastened to the left and right side plates 41L and 41L along the X-axis direction. More specifically, the rear stay 49 is fastened to the left side plate 41L along the +X direction and to the right side plate 41R along the −X direction. In the second fastening positions RP2, the rear stay 49 is fastened to the upper stay 43 along the −Y direction. The first and second fastening positions RP1 and RP2 are aligned on the same axis in the X-axis direction.

Also, as shown in FIG. 7A to FIG. 8B, the first fastening positions LP1, FP1 and RP1 of the lower stay 45, the front stay 47 and the rear stay 49 with the left and right side plates 41L and 41R are arranged on the front side and the rear side of the notch 41*d*.

The left and right side plates 41L and 41R and each stay are formed with engagement pieces and engagement holes positioned to each other. The left and right side plates 41L and 41R has fixing pieces to be fixed to the apparatus main body 1*a* of the image forming apparatus 1. In addition, the apparatus main body 1*a* of the image forming apparatus 1 has a positioning hole (not shown) in which the positioning pin 45*h* provided in the lower stay 45 of the fixing frame 25 is fitted. Descriptions of these are omitted.

In addition, the fixing frame 25 is provided with a guide member 61 and a conveyance rollers pair 63, as shown in FIG. 3. The guide member 61 is disposed between the front stay 47 and the lower stay 45 of the fixing frame 25. The conveyance rollers pair 63 is disposed between the rear stay 49 and the lower stay 45 of the fixing frame 25.

As described above, the belt assembly 21 and the pressure roller 23 are supported by the fixing frame 25. More specifically, the left and right end portions of the rotating shaft 23*a* of the pressure roller 23 are inserted into the notches 41*d* of the left and right side plates 41L and 41R of the fixing frame 25 and supported rotatably. In addition, both the end holders of the belt assembly 21 are also inserted into the notch 41*d*. As a result, the fixing nip N is formed between the fixing belt 31 facing the heater 35 and the pressure roller 23. As shown in FIG. 4, a driving gear 51 is fixed to one end of the rotating shaft 23*a*. The driving gear 51 is connected to a motor 57 via a gear train 55.

When the belt assembly 21 and the pressure roller 23 are thus supported by the fixing frame 25, the upper stay 43, the lower stay 45, the front stay 47 and the rear stay 49 are arranged to surround the belt assembly 21 and the pressure roller 23 as shown in FIG. 3. In addition, the first fastening position LP1 between the lower stay 45 and the left and right side plates 41L and 41R, the first fastening position FP1 between the front stay 47 and the left and right side plates 41L and 41R, and the first fastening position RP1 between the rear stay 49 and the left and right side plates 41L and 41R will also be arranged to surround the belt assembly 21 and the pressure roller 23.

The fixing operation of the fixing device 9 having the above configuration will be described with reference to FIG. 3 and FIG. 4. The sheet in which the toner image is formed on one side by the image forming part 7 is conveyed along the guide member 61 to the fixing nip N. In addition, the motor 57 is driven to rotate the driving gear 51 in the clockwise direction of FIG. 4 via the gear train 55. As the driving gear 51 rotates in this manner, the pressure roller 23 is rotated in one direction (the clockwise direction in this example), and the fixing belt 31 in contact with the pressure roller 23 at the fixing nip N is rotated in the other direction (in this example, the counterclockwise direction). Thus, the sheet guided by the fixing nip N passes through the fixing nip N. At this time, the toner image is heated and pressurized to be fixed on the sheet. The sheet is then conveyed by the conveyance rollers pair 63 toward the sheet discharge device 11.

As described above, the driving gear 51 fixed to the rotating shaft of the pressure roller 23 is supported by the left side plate 41L. When the motor 57 is driven and the transmission gear 55X, positioned on the lowermost stream of the gear train 55, is rotated in the counterclockwise direction of FIG. 4, the driving gear 51 is rotated and a load is applied from the transmission gear 55X to the driving gear 51 along the rotational direction of the transmission gear 55X (see the white blank arrow in FIG. 4). In other words, the load along the rotational direction of the transmission gear 55X is applied to the left side plate 41L on which the driving gear 51 is supported, with respect to the fixed area between the fixing frame 25 and the housing of the image forming apparatus 1. Then, a difference in the load applied to the left side plate 41L and the right side plate 41R is generated, and the fixing frame 25 may be twisted. If the fixing frame 25 may be twisted, the position of the pressure roller 23 and the belt assembly 21 supported by the fixing frame 25 may be changed, causing the fixing belt 31 to meander or sheet conveying failure.

However, as described above, in the fixing device 9 of the present invention, the upper stay 43, the lower stay 45, the front stay 47 and the rear stay 49 are arranged to surround the pressure roller 23 and the belt assembly 21 as shown in FIG. 3. Furthermore, the lower stay 45, the front stay 47 and the rear stay 49 are fastened to the left and right side plates 41L and 41R.

More specifically, the lower stay 45 is fastened to the left and right side plates 41L and 41R at the first to third fastening positions LP1, LP2 and LP3. In the first fastening position LP1, they are fastened along the X-axis direction, in the second fastening position LP2, they are fastened along the Y-axis direction, and in the third fastening position LP3, they are fastened along the Z-axis direction. That is, the lower stay 45 is fastened to the left and right side plates 41L and 41R along the three axial directions of the XYZ coordinates. Furthermore, the front stay 47 is fastened to the left and right side plates 41L, 41R and the upper stay 43 at the first and second fastening positions FP1, FP2. In detail, in the first fastening position FP1, they are fastened along the X-axis direction, and in the second fastening position FP2, they are fastened along the Y-axis direction. Further, the rear stay 49 is fastened to the left and right side plates 41L, 41R and the upper stay 43 at the first and second fastening positions RP1, RP2. In detail, in the first fastening position RP1, they are fastened along the X-axis direction, and in the second fastening position RP2, they are fastened along the Y-axis direction.

As described above, since each stay is fastened to the left and right side plates 41L, 41R or the upper stay 43 along at least two axial directions of the three axial directions of the XYZ coordinates, rigidity of the whole of the fixing frame 25 can be increased. Therefore, even if a load is applied only to one side plate, deformation of the left and right side plates 41L and 41R can be prevented. Alternatively, the left and right side plates 41L and 41R can be equally deformed.

In addition, the lower stay 45 is provided with the positioning pin 45*h* positioned with the apparatus main body 1*a*. Thus, the left and right side plates 41L and 41R can be positioned reliably with respect to the apparatus main body 1*a* via the lower stay 45.

Since the deformation of the fixing frame 25 can be suppressed in this way, the displacement of the pressure roller 23 and the belt assembly 21 during the rotation of the pressure roller 23 can be prevented. Thus, the meandering of the fixing belt 31 and sheet conveying failure can be suppressed.

Furthermore, as shown in FIG. 4, the first fastening position LP1 between the lower stay 45 and the left and right side plates 41L and 41R, the first fastening position FP1 between the front stay 47 and the left and right side plates 41L and 41R, and the first fastening position RP1 between the rear stay 49 and the left and right side plates 41L and 41R are arranged around the pressure roller 23 and the belt assembly 21. Furthermore, the left and right first to third fastening positions LP1, FP1 and RP1 are arranged on the same axis along the X-axis direction. Therefore, even if a load is applied to one side plate during the rotation of the pressure roller 23, the relative position between the pressure roller 23 and the belt assembly 21 can be maintained.

In addition, the fastening direction at the fastening position of each stay on one side in the X-axis direction is the same as the fastening direction at the fastening position of each tray on the other side in the X-axis direction. For example, the fastening directions at the second fastening position LP2 between the lower stay 45 and the left side plate 41L and at the second fastening position LP2 between the lower stay 45 and the right side plate 41R are the same +Y direction. Thus, the left and right side plates 41L and 41R can be supported with equal direction and force.

Although the invention has been described for a specific embodiment, the invention is not limited to the above embodiment. A person skilled in the art can modify the above embodiment as long as it does not deviate from the scope and spirit of the invention.

The invention claimed is:

1. A fixing device comprising:

a heating rotating body and a pressure rotating body which come into contact with each other to form a fixing nip; and a fixing frame by which the heating rotating body and the pressure rotating body are supported, wherein the fixing frame includes:

a pair of side plates disposed to face each other, and supporting both axial end portions of the heating rotating body and both axial end portions of the pressure rotating body; and a plurality of stays disposed between the side plates, in an XYZ coordinate in which an axis along a direction in which the side plates face each other is defined as the X-axis, and axes perpendicular to the X-axis and perpendicular to each other are defined as the Y-axis and the Z-axis, each of the stays is fastened to the side plates or the other stay along at least two axial directions of the three axial directions of the XYZ coordinates.

2. The fixing device according to claim 1, wherein the stays are arranged around the heating rotating body and the pressure rotating body.

3. The fixing device according to claim 1, wherein the side plates have notches by which a rotating shaft of the heating rotating body and a rotating shaft of the pressure rotating body are inserted, and the stays are arranged around the notches.

4. The fixing device according to claim 1, wherein each of the stays is fastened to the side plates on the same axial direction along the X-axis direction.

5. The fixing device according to claim 1, wherein a fastening direction in the fastening position of each of the stays on one side in the X-axis direction and a fastening direction in the fastening position of the stay on the other side in the X-axis direction are the same axial direction.

6. The fixing device according to claim 1, wherein the plurality of stays includes at least three stays.

7. The fixing device according to claim 1, wherein the heating rotating body is an endless sliding belt.

8. An image forming apparatus comprising:

an image forming part which forms an image on a sheet;

the fixing device according to claim 1, which fixes the image on the sheet; and an apparatus main body by which the image forming part and the fixing device are supported, wherein at least one of the stays of the fixing device has a positioning pin positioned to the apparatus main body.

* * * * *